United States Patent [19]
Moses et al.

[11] Patent Number: 5,615,977
[45] Date of Patent: Apr. 1, 1997

[54] FLEXIBLE/RIGID RISER SYSTEM

[75] Inventors: Charles J. Moses, Alvarado; Rajko M. Simic, Arlington, both of Tex.

[73] Assignee: Continental Emsco Company, Garland, Tex.

[21] Appl. No.: 117,307

[22] Filed: Sep. 7, 1993

[51] Int. Cl.⁶ .................................... F16L 1/04
[52] U.S. Cl. ................ 405/195.1; 166/350; 285/166; 405/169
[58] Field of Search ............... 405/195.1, 224.2, 405/224.3, 169, 170, 171; 166/351, 359, 367; 285/166

[56] References Cited

U.S. PATENT DOCUMENTS

| | | |
|---|---|---|
| 486,986 | 11/1892 | Schinke . |
| 894,168 | 7/1908 | Smith ............................ 405/171 |
| 2,836,436 | 5/1958 | Bianchi ........................... 285/113 |
| 3,168,334 | 2/1965 | Johnson .......................... 285/55 |
| 3,236,544 | 2/1966 | Brown ............................ 285/97 |
| 3,434,295 | 3/1969 | Manning . |
| 3,450,421 | 6/1969 | Harwell ......................... 166/359 X |
| 3,461,916 | 8/1969 | Ledgerwood, Jr. ............... 138/120 |
| 3,523,578 | 8/1970 | Nolan et al. ................... 166/359 |
| 3,601,187 | 8/1971 | Tidwell ......................... 166/359 X |
| 3,658,366 | 4/1972 | Welch, Jr. et al. ............. 285/24 |
| 3,727,954 | 4/1973 | Oliver ......................... 405/224.2 X |
| 3,746,372 | 7/1973 | Hynes et al. .................. 285/95 |
| 3,782,458 | 1/1974 | Slack ........................... 166/359 X |
| 3,813,477 | 5/1974 | Fischer ......................... 174/70 R |
| 3,841,357 | 10/1974 | Heijst ........................... 138/120 |
| 4,065,822 | 1/1978 | Wilbourn ........................ 9/8 P |
| 4,068,868 | 1/1978 | Ohrt ............................. 285/263 |
| 4,100,752 | 7/1978 | Tucker .......................... 61/86 |
| 4,173,360 | 11/1979 | Bergman et al. . |
| 4,265,567 | 5/1981 | Nybo . |
| 4,400,110 | 8/1983 | Beynet et al. .................. 166/367 X |
| 4,406,482 | 9/1983 | Clebant . |
| 4,416,473 | 11/1983 | Lamy et al. . |
| 4,432,670 | 2/1984 | Lawson . |
| 4,448,568 | 5/1984 | Gentry et al. .................. 405/169 |
| 4,570,716 | 2/1986 | Genini et al. .................. 405/169 |
| 4,593,941 | 6/1986 | Whightsil, Sr. . |
| 4,661,016 | 4/1987 | Baugh et al. ................... 405/170 X |
| 4,784,410 | 11/1988 | Peppel et al. . |
| 4,793,737 | 12/1988 | Shotbolt ........................ 166/367 X |
| 4,906,137 | 3/1990 | Maloberti et al. ............... 405/170 X |
| 4,909,327 | 3/1990 | Roche . |
| 4,984,827 | 1/1991 | Peppel et al. . |
| 5,147,148 | 9/1992 | White et al. .................... 405/224.2 X |

FOREIGN PATENT DOCUMENTS

| | | | |
|---|---|---|---|
| 2518604 | 11/1976 | Germany ...................... 166/367 |
| 2009093 | 6/1979 | United Kingdom ............ B67D 5/60 |
| 2097358 | 11/1982 | United Kingdom ............ B67D 5/60 |
| 2148842 | 6/1985 | United Kingdom ............ B67D 5/68 |

OTHER PUBLICATIONS

*Flexible Riser Use Okay in North Sea*, May 1984, pp. 209–210.

F. Dawans, *Syntactic Foams as Buoyancy Materials for Deep Offshore Technology*, Apr. 1986, p. 109.

Keith Shotbolt, *Designing Flexible Risers for Deepwater Application*, Feb. 1992, pp. 34 and 36.

Leonard LeBlanc, *Will Drill Floors, Derricks, Tubulars Become Obsolete?*, Oct. 1993, p. 22.

*Primary Examiner*—Dennis L. Taylor
*Attorney, Agent, or Firm*—Arnold, White & Durkee

[57] ABSTRACT

A continuous bend flexible/rigid riser system is provided for coupling a subsea location to an offshore platform or vessel. The riser system comprises a first rigid pipe section coupled at its upper end to the platform. A plurality of intermediate pipe sections are mutually coupled end to end, and are coupled in series with the first rigid pipe section by means of a plurality of flexible couplings. The lower end of the last in the series of intermediate pipe sections is coupled to the subsea location. The flexible/rigid riser system reduces bending stresses transmitted along the riser by allowing angular displacement of the pipe sections with respect to one another.

20 Claims, 6 Drawing Sheets

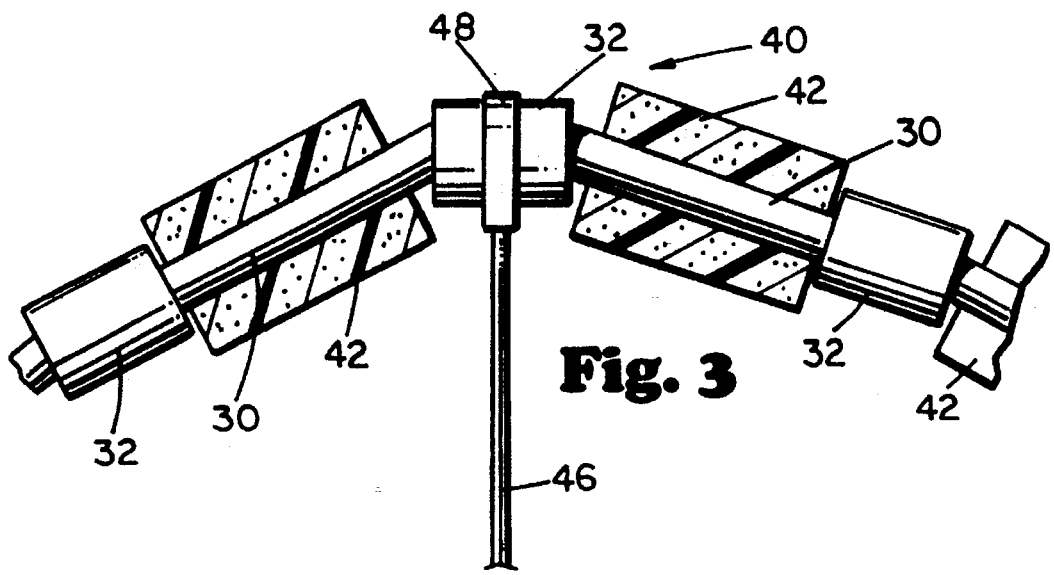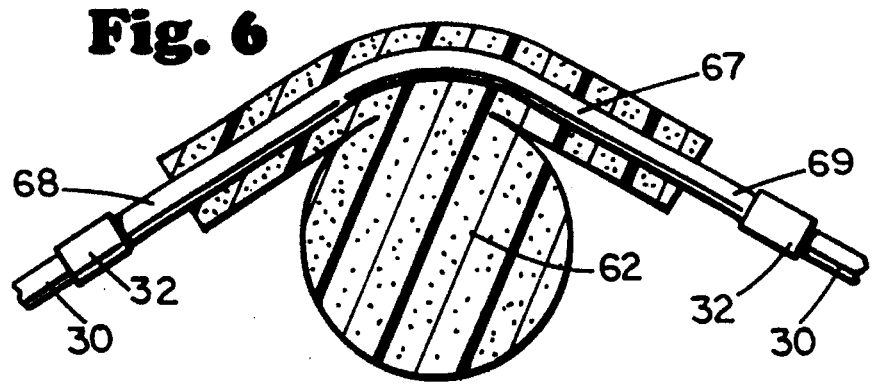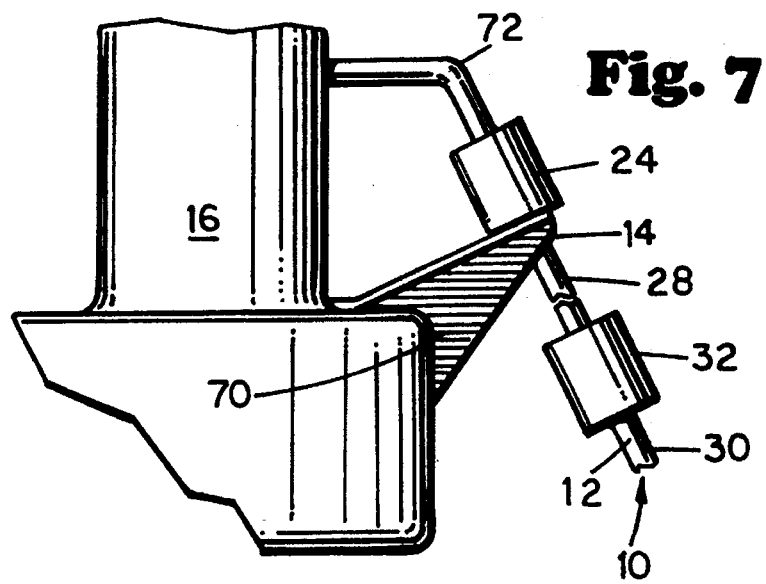

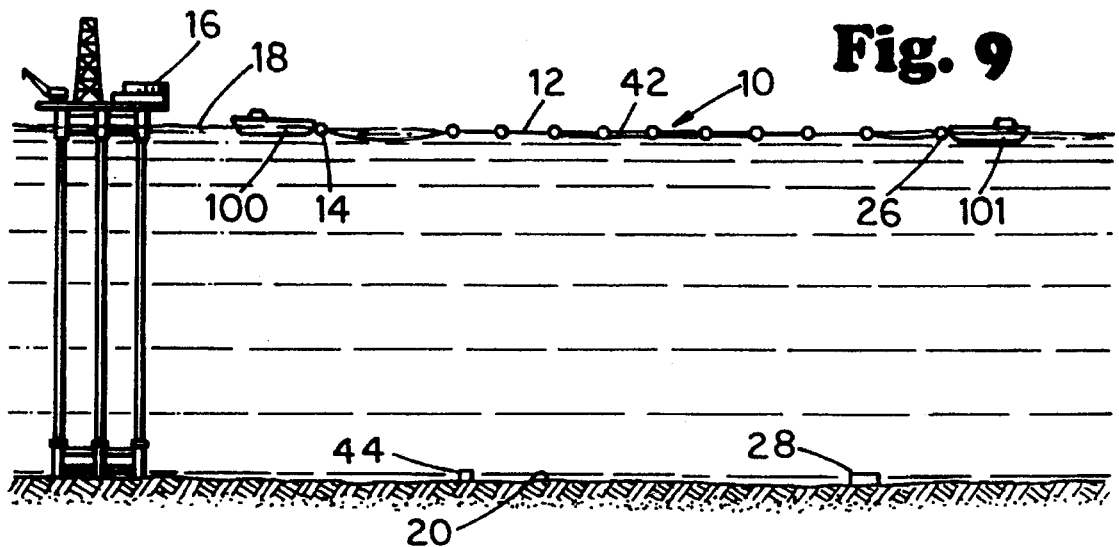
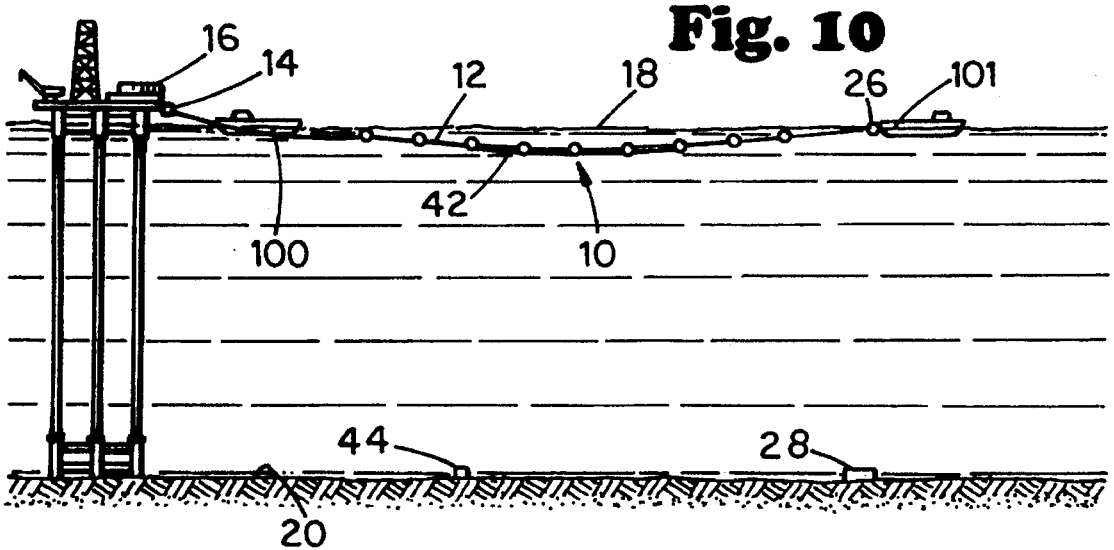
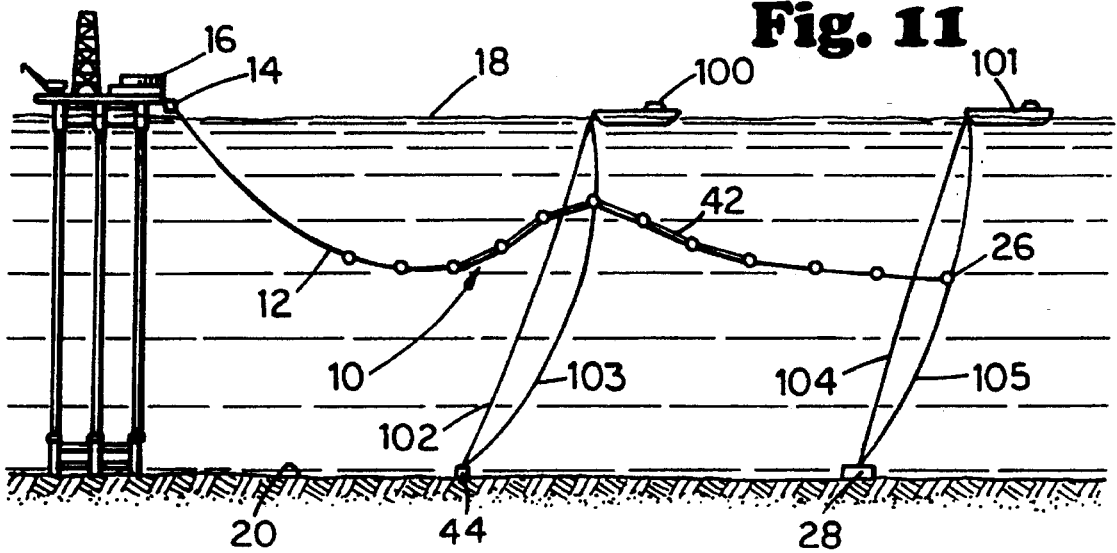

FLEXIBLE/RIGID RISER SYSTEM

BACKGROUND OF THE INVENTION

1. Field of the Invention

The present invention relates generally to a riser system and, more particularly, to a riser system for coupling a subsea drilling or storage point to a floating vessel.

2. Description of Related Art

The advent of subsea oil and gas operations has posed a great number of technical difficulties that have been addressed with varying degrees of success. One recurring problem involves providing coupling lines between the subsea well head or template and the work or production platform on the surface of the sea. Such coupling lines are required for the passage of equipment to and from the subsea location and for the delivery of fluids to and from the subsea location both during the drilling operation and during later production or servicing. Due to the quantities of materials transported between the subsea location and the platform, these coupling lines, or "risers" as they are known in the art, are most often relatively large, heavy lines, and can be of considerable length. Because the risers are in effect the litelines of a subsea operation, their integrity and reliability are key to the success and profitability of the installation.

A principal difficulty associated with riser systems is bending due in part to the weight of the riser, but primarily resulting from movement of the surface platform or vessel relative to the seabed. The surface structure coupled to the subsea location via a riser generally has at least some degree of freedom of movement with respect to the subsea location. Such movement is most often caused by such factors as tides, currents, swells, wave action, wind, and thermal effects. Moreover, modern deep water installations make use of floating surface structures tied to the seabed by anchors and mooring lines at some distance from the subsea template. Thrusters may also be employed to maintain the position of the surface platform or vessel relative to the seabed. However, even where such anchoring and positioning techniques are used, floating structures still exhibit more movement than do fixed drilling and production platforms. Water depths in excess of about 300 meters require compliant floating platforms that, in turn, create the need for somewhat flexible riser conduit connections between the seabed and the platform due to the bending that occurs in the riser as the platform or vessel moves on the sea surface. In addition, even in relatively shallow water, heavy risers may undergo considerable bending stresses that may threaten the integrity of the riser system.

Risers are typically deployed either in straight sections descending directly from the surface platform to the seabed or in a continuous bend catenary configuration in which the riser follows a natural bend radius determined by its size, rigidity, and length. Straight risers generally employ flexible joints at the upper and/or lower ends of the riser. A disadvantage of such risers is the need for riser tensioner systems to support the weight of the column of pipe to prevent buckling. In the catenary configuration, the weight of the riser itself provides tensioning for the vertical, or near vertical, sections of pipe descending from the surface platform or vessel. As the riser approaches the seabed, it assumes a continuous bend due to its natural tendency to droop under its own weight and under the loads imposed on it. The catenary configuration is particularly useful in greater depths of water where the surface platform or vessel is positioned at some distance from the subsea tie-in point. However, as larger sizes of pipe, having wider bending radii, are utilized for the riser, the bending stresses resulting from the catenary configuration increase. Thus, the size of risers that are capable of deployment in the catenary configuration is effectively limited by the bending radius and bending stresses.

To mitigate the effect of stresses on riser systems, buoyancy or ballasting elements may be attached to at least a portion of the submerged length of the riser. Such elements usually comprise synthetic foam elements or individual buoyancy or ballasting tanks. These tanks may be formed or deployed on the outer surface of riser sections and, unlike foam elements, are capable of being selectively ballasted with water or inflated with air using the floating vessel's air compression equipment. These buoyancy devices create upwardly directed forces in the riser and thereby compensate somewhat for stresses created by the weight of the riser. However, experience shows that such buoyancy devices cannot generally compensate for sufficient stress to preclude failure of the riser.

Several solutions to the problem of limiting the effect of bending stresses in riser systems are currently offered. One solution includes the use of flexible hose or conduit. Such flexible conduit may be employed with bend stiffeners, or stress joints, at the upper end where the riser ties into the platform, at the lower end where the riser ties into the well head or template, or at both the upper and lower ends. This solution may provide a riser system that is somewhat immune to the adverse structural effects of bending stresses because the conduit is relatively free to bend, thus transmitting little bending moment to the conduit wall. However, the use of flexible conduit has several drawbacks. First, flexible conduit is expensive. In addition, such conduit is more susceptible to damage than metal pipe due to its structure and the materials of which it is constructed. Finally, reliability and service life of flexible conduit in riser systems have yet to be proven. While bend stiffeners generally extend the service life of flexible conduit, they add significantly to the cost of the overall riser system.

Another known solution is the use of rigid pipe sections welded end to end to form a continuous riser. Although the term "rigid pipe" would seem to imply a lack of flexibility, in reality, even large, heavy pipe permits some bending without rupture; and over the total length of pipe utilized in a typical riser system, a considerable degree of bending is often possible. Rigid pipe risers are often equipped with flexible connectors at the upper and/or lower ends of the riser. Such flexible connectors function to tie the riser into the platform piping or the seabed template and, typically, accommodate several degrees of swivel of the riser pipe relative to the tie-in point. While this solution offers the advantage of being less costly than flexible conduit risers, the pipe comprising the riser is much more susceptible to bending stresses resulting from movement of the platform or vessel. In addition, as mentioned above, the size of the pipe employed in the riser is limited in the catenary configuration.

While the goal of minimizing the bending stresses in immersed pipelines has been generally recognized in the prior art, no satisfactory solution has yet been proposed that could be extended to application on riser systems. The present invention is directed to overcoming or minimizing the problems set forth above.

SUMMARY OF THE INVENTION

In accordance with one aspect of the invention, there is provided a continuous bend flexible/rigid riser system having a first rigid pipe section, a first end of which is coupled to an offshore platform. The riser system also includes a plurality of intermediate rigid pipe sections coupled in series with the first rigid pipe section, and with one another by a pluarality of respective flexible couplings. A last pipe section in the series of intermediate pipe sections is coupled to a subsea location.

BRIEF DESCRIPTION OF THE DRAWINGS

The present invention will become more fully understood from the following detailed description, taken in conjunction with the accompanying drawings, wherein like reference numerals refer to like parts, in which:

FIG. 3 is a schematic, side elevation of a portion of the riser in accordance with the invention, illustrating the placement of buoyancy elements in the arrangement shown in FIG. 2;

FIG. 6 is a schematic, side elevation of a buoyancy device as shown in FIG. 5;

FIG. 7 is a schematic, side elevation illustrating a typical arrangement for attaching the riser to an offshore platform;

FIGS. 9, 10, and 11 are schematic, side elevations depicting successive stages in a preferred method for installing the riser in accordance with the invention.

Figure 1:
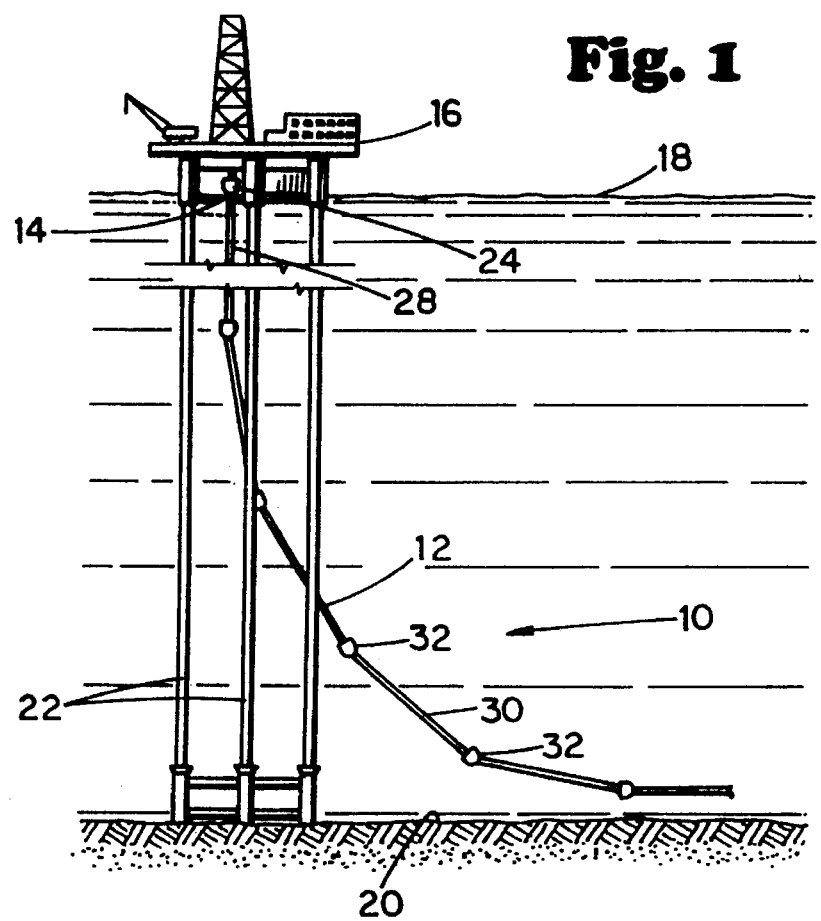
FIG. 1 is a schematic, side elevation of a riser system in accordance with the present invention, deployed in a first typical installation configuration.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DESCRIPTION OF THE PREFERRED EMBODIMENTS

Turning now to the drawings and referring to FIG. 1, a riser system, generally designated by the reference numeral 10, is depicted, deployed in a first installation configuration. The configuration shown in FIG. 1 is generally known as the catenary configuration. In this configuration, the weight of the riser 12 itself generally suffices to maintain tension on the riser 12, and a generally continuous bend is formed as the riser 12 droops naturally toward the seabed 20. As illustrated in FIG. 1, the riser 12 has an upper end 14 coupled to an offshore platform 16. Such platforms 16 are typically drilling or production platforms, and it will be understood that the platform 16 may be a fixed or floating platform, or a vessel positioned offshore. Such floating platforms are common, particularly in deep water operations, and are often referred to as tension leg platforms, or TLP's. The platform 16 rises above the surface 18 of the sea, and is attached to the seabed 20 by securing means 22. These securing means are typically rigid legs, in the case of fixed platforms, or tension members, such as mooring lines and anchor lines, in the case of floating platforms and vessels.

It will be understood that, deployed as illustrated in the drawings, the riser 12 may be subject to changes in orientation with respect to the platform 16 due to the movement of the platform 16 on the surface 18 of the sea or due to movement of the sea water. Typically, movement of the platform 16 with respect to the riser 12 may occur about and along all three axes of the platform 16, represented in FIG. 4 by the letters X, Y, and Z, including: yaw (a twisting motion about the vertical axis Y of the platform 16), heave (rising and descending motions along the vertical axis Y of the platform 16), roll (a twisting motion about the axis X of the platform 16 generally in line with the riser 12), approach (a motion along the axis X of the platform 16 in line with the riser 12 generally toward and away from the riser 12), pitch (a twisting motion about the axis Z of the platform 16 generally perpendicular to the riser 12), and sway (a to and fro movement generally along the Z axis, tangential or perpendicular to the riser 12). Any or all of these types of motion may of course occur at once.

An upper flexible coupling 24 is provided adjacent the upper end 14 of the riser 12 and serves to attach the riser 12 to the platform 16. As will be more fully described below, the riser 12 typically joins the platform 16 at a predetermined angle with respect to the vertical orientation of the platform 16 and is free to move pivotally in the upper flexible coupling 24 as the platform 16 moves relative to the seabed 20. The upper flexible coupling 24 allows considerable pivotal freedom of the riser 12 with respect to the platform 16 in order partially to compensate for such motion of the platform 16. The upper flexible coupling 24 preferably permits rotation of the upper end 14 of the riser 12 of the order of 15 degrees or more in any direction from the angle at which the riser 12 joins the platform 16.

Figure 2:
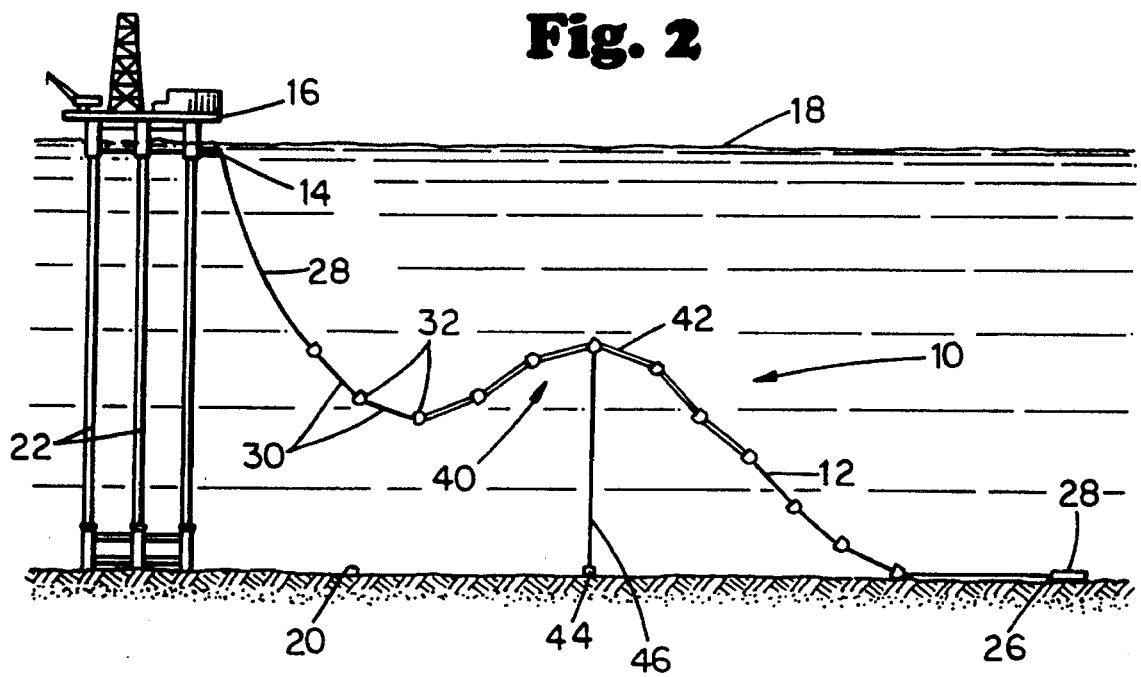
FIG. 2 is a schematic, side elevation of a riser system in accordance with the invention, deployed in a second typical installation configuration, showing a first preferred arrangement of buoyancy elements positioned along the riser.

As illustrated in FIG. 2, the lower end 26 of the riser 12 is coupled to a subsea location designated generally by the reference numeral 28. This subsea location 28 will typically be a well head or template, but could also be the termination point of a submerged pipeline. The means utilized to couple the riser 12 to the subsea location 28 are generally the same as those presently known in the art for coupling rigid or flexible risers to templates and well heads, and may include a flexible coupling similar to the upper flexible coupling 24.

Figure 4:
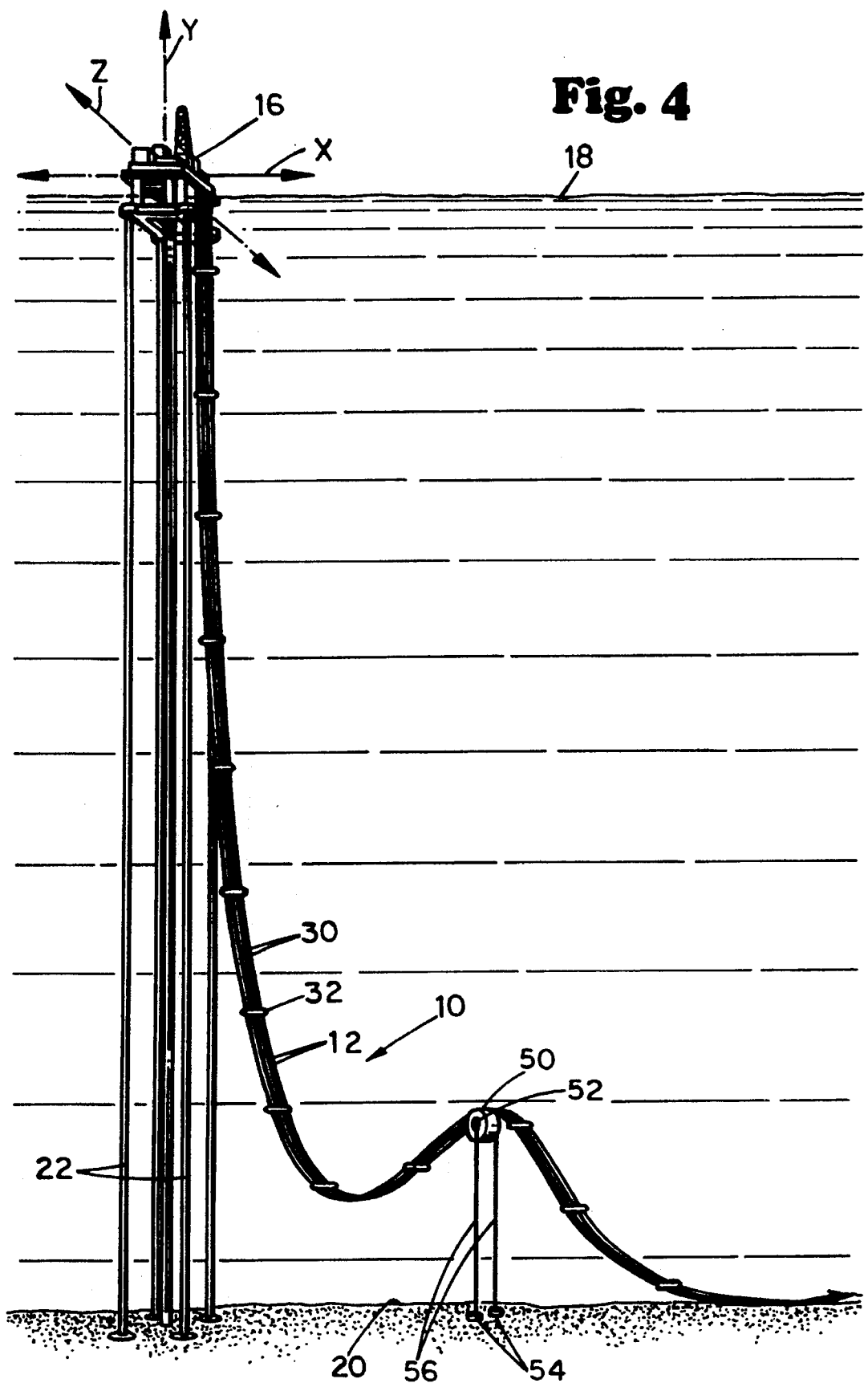
FIG. 4 is a schematic, perspective view of a riser system in accordance with the invention, in the same installation configuration as shown in FIG. 2, showing a second preferred arrangement of a buoyancy device positioned along the riser.

Between its upper end 14 and its lower end 26, the riser 12, which assumes a continuous bend as illustrated in FIGS. 1, 2 and 4, is comprised of an upper pipe section 28 adjacent the upper end 14, and a plurality of intermediate pipe sections 30 coupled to one another and to the upper pipe section 28 by means of flexible couplings 32. Depending upon the length and size of the riser 12, the upper pipe section 28 may assume a generally vertical orientation as depicted in FIGS. 1 and 4, or it may be bent to some extent as it descends from the platform 16, as is typical for known rigid pipe risers. As has been indicated, this angle of descent often changes to some degree due to the movement of the platform 16 relative to the seabed 20. The upper pipe section 28 and the intermediate pipe sections 30 are preferably rigid pipe sections of the type and grade currently employed in rigid pipe risers. A typical grade of riser pipe is API 5L, Grade X-65, having a yield strength of 65 kips per square inch (ksi). The construction of the flexible couplings 32 will be described in greater detail below, but the flexible couplings 32 are of a type generally similar to the upper flexible coupling 24. The flexible couplings 32 allow pivotal movement of one pipe section 30 with respect to the adjacent pipe section 30 and, preferably, permit angular displacement of adjacent pipe sections 30 of at least 12 degrees in all directions. Moreover, the flexible couplings 32 maintain the internal pressure of the riser 12 and translate axial tension along the riser system 10.

As will be discussed in more detail below, an important aspect of the riser system 10 is the number, placement, and stiffness of the flexible couplings 32 along the riser 12, and the corresponding number and length of the intermediate pipe sections 30. While the risers 12 depicted in the drawings generally have uniformly spaced flexible couplings 32, this may not be the optimal placement in a specific application. The design of the riser system 10 for a particular installation preferably includes specification of the length of the upper pipe section 28, the number of flexible couplings 32, the length of the intermediate pipe sections 30 and the stiffness of the flexible couplings 32. While an object of any method of riser design is to reduce the bending stresses transmitted to the pipe sections 28 and 30 to levels below material limits for the pipe utilized, by taking into account the indicated design parameters, the bending stresses can be further reduced and the riser design optimized. The material limits of the pipe are determined by analytical techniques well established in the field of strength of materials and generally depend upon the properties of the materials utilized, the geometry of the loaded material, and the type, magnitude, and orientation of the load applied. While specific installations will require risers 12 having differing specifications as to the number, placement, and stiffness of the flexible couplings 32, it should be borne in mind that the design principles and the general construction of the riser 12 described herein are substantially identical in all cases.

Figure 5:
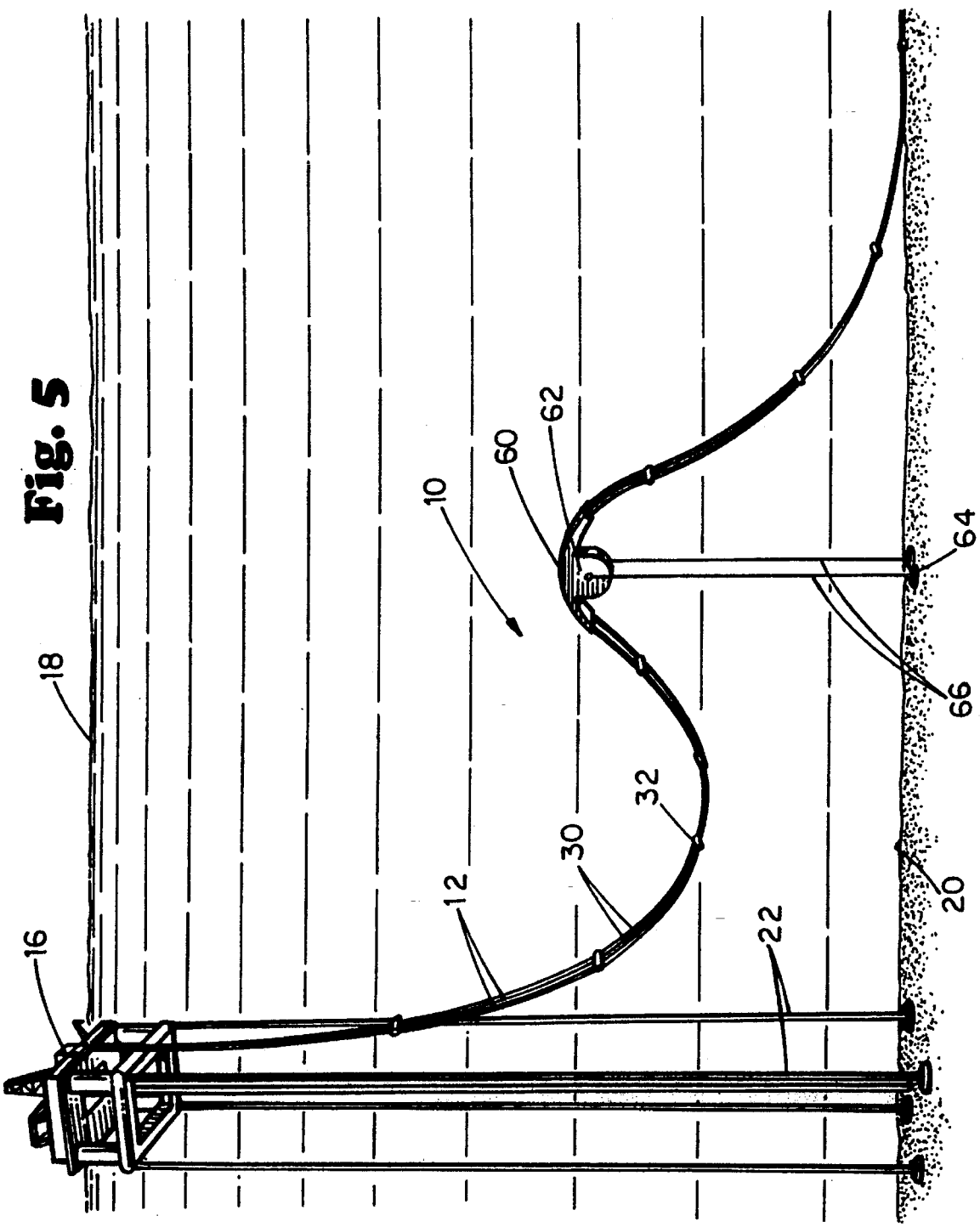
FIG. 5 is a schematic, perspective view of a riser system in accordance with the invention in the same installation configuration as shown in FIG. 2, showing a third preferred arrangement of a buoyancy device positioned along the riser.

While the catenary configuration of the riser 12 is preferred, a modified catenary configuration may be advantageously employed to provide the continuous bend indicated above, as illustrated in FIGS. 2, 4, and 5. This configuration, sometimes referred to as the "Lazy S" configuration, is achieved by the use of flotation or buoyancy devices 42, 52, 62 positioned along a portion of the riser 12. The buoyancy devices 42, 52, 62 cause the riser to be lifted from the seabed 20 to a level at which the buoyant force applied by the devices reaches equilibrium with the weight of the riser 12. This technique effectively reduces the stress on the pipe resulting from its own weight and increases the bend radius of the riser 12 as it nears the seabed 20. This modified catenary configuration is particularly useful in deep water applications and where particularly large, heavy pipe is employed in the construction of the riser 12. An advantage of the modified catenary configuration resides in the its ability to afford movement of the riser 12 in response to movement of the platform 16. In this configuration the floating portion of the riser 12 is somewhat free to approach and withdraw from the platform 16 due to changes in loading conditions caused by the motion of the platform 16 and sea currents.

FIG. 2 depicts a riser system 10 deployed in a modified catenary configuration to provide a continuous bend, achieved by a first preferred arrangement. As shown in FIG. 2, the upper pipe section 28 of the riser 12 descends from the platform 16 and is coupled to a number of intermediate pipe sections 30. The upper pipe section 28 and the intermediate pipe sections 30 are mutually coupled end to end by means of flexible couplings 32 as described above. Along a portion of the riser 12, designated generally by the reference numeral 40 in FIG. 2, buoyancy elements 42 are positioned to raise the riser 12 from the seabed 20. The buoyancy elements 42 are preferably synthetic foam elements or individual buoyancy tanks of the type sometimes employed with known rigid pipe and flexible risers. As illustrated in FIG. 3, the buoyancy elements 42 are positioned along the pipe sections 30 included in the riser portion 40 and between the flexible couplings 32.

The buoyancy elements 42 apply an upward force on the pipe sections 30 comprising the riser portion 40, thereby causing the riser 12 to be raised from the seabed 20. The number and size of the buoyancy elements 42 are selected to provide sufficient buoyant force to lift the riser 12, generally in the same manner as similar buoyancy elements are specified for use with rigid or flexible risers. It will be understood that the buoyant force imparted on the riser 12 by the buoyancy elements 42 should be sufficient to lift the riser 12 when the riser 12 is at its heaviest weight, that is, when the material passing through the riser is heaviest. This will ensure that the riser 12 remains in the modified catenary configuration shown in FIG. 2.

To limit the uppermost raised position of the riser 12 when the riser 12 is at a weight lower than that required for equilibrium with the buoyancy elements 42, a tension member 46 is attached between the riser 12 and the seabed 20. The tension member 46 may be attached to the riser 12 by any suitable means as will be apparent to one skilled in the art, such as by a collar fitting 48 around a pipe section 30 or flexible coupling 32 as illustrated in FIG. 3. The tension member 46 is attached to the seabed 20 at an anchoring point 44 by any suitable anchoring or mooring technique.

A second preferred arrangement for deploying the riser 12 in a modified catenary configuration is illustrated in FIG. 4. The principle of operation of this arrangement is the same as for the arrangement described in reference to FIG. 2. The arrangement depicted in FIG. 4, however, employs a single buoyancy element 52 positioned at a given location 50 along the riser 12. The buoyancy element 52 is preferably cylindrical or drum shaped and is provided with tension members 56 as illustrated schematically in FIG. 4. The riser 12 is preferably rigidly attached to the buoyancy element 52 at the given location 50 so as to prevent the riser 12 from sliding off the buoyancy element 52. This attachment may be accomplished by any suitable means, such as by metal straps or collars (not shown) looping over the riser 12. The tension members 56 are attached to the seabed 20 at anchoring points 54 in the same manner as described above in reference to the first arrangement. It will be understood that in lieu of the compounded effect of the plurality of buoyancy elements 42 as described above, the single buoyancy element 52 alone provides sufficient buoyant force to lift the riser 12 from the seabed 20, with the riser 12 assuming a catenary droop on either side of the given location 50.

A third preferred arrangement for achieving a modified catenary configuration in the riser 12 is illustrated in FIG. 5. This arrangement functions generally in the same manner as the first two arrangements described above and is substantially similar to the second arrangement shown in FIG. 4 in that a single buoyancy element 62 is provided at a given location 60 along the riser 12. However, the third preferred arrangement illustrated in FIG. 5 employs a buoyancy element 62 that is rigidly attached to, or made integral with, a very rigid pipe section 67 as shown schematically in FIG. 6.

As shown in FIG. 6, the buoyancy element 62 is positioned below the rigid pipe section 67 and made integral with the pipe section 67 either during fabrication or assembly of the buoyancy element 62. The buoyancy element 62 serves to provide the buoyant force to lift the riser 12 from the seabed 20 as described above, while the rigid pipe section 67 supports the load of the buoyant force that is generally concentrated in the region of the riser 12 immediately above the buoyancy element 62. The rigid pipe section 67 is preferably curved or bent around the buoyancy element 62 and terminates in two ends 68, 69 that face downwardly toward the seabed 20. The angle of curvature of the rigid pipe section 67 preferably corresponds to the continuous bend of the natural catenary droop that the riser 12 will assume when deployed as shown in FIG. 5. As will be appreciated by one skilled in the art, this angle of curvature may vary depending upon the parameters of a specific installation and can generally be estimated using a computerized riser simulation program, as will be more fully described below. The ends 68, 69 of the rigid pipe section 67 are coupled to flexible couplings 32, that are in turn coupled to intermediate pipe sections 30. The rigid pipe section 67 thereby forms an integral part of the riser system 10.

The riser 12 is preferably coupled to the platform 16 as illustrated schematically in FIG. 7. As described above, the upper pipe section 28 of the riser 12 joins the platform 16 at a predetermined angle with respect to the vertical orientation of the platform 16. The upper end 14 of the riser 12 preferably penetrates through a strong, rigid porch 70 fixed to the platform 16 and generally in line with the riser 12. The upper end 14 of the riser 12 is coupled to a flexible coupling 24 that is of generally known construction, substantially similar to the flexible couplings 30. The porch 70 is preferably oriented perpendicularly to the angle at which the riser 12 joins the platform 16, allowing the flexible coupling 24 to be supported on the porch 70. The load represented by the weight of the riser 12 is transmitted to the platform 16 through the porch 70. A tie-in pipe section 72 is coupled to the flexible coupling 24 and serves to couple the riser system 10 to the platform equipment (not shown). As described above, the flexible coupling 24 allows the riser 12 to pivot in all directions from its predetermined angle of attachment in response to movements of the platform 16 with respect to the seabed 20.

Figure 8:
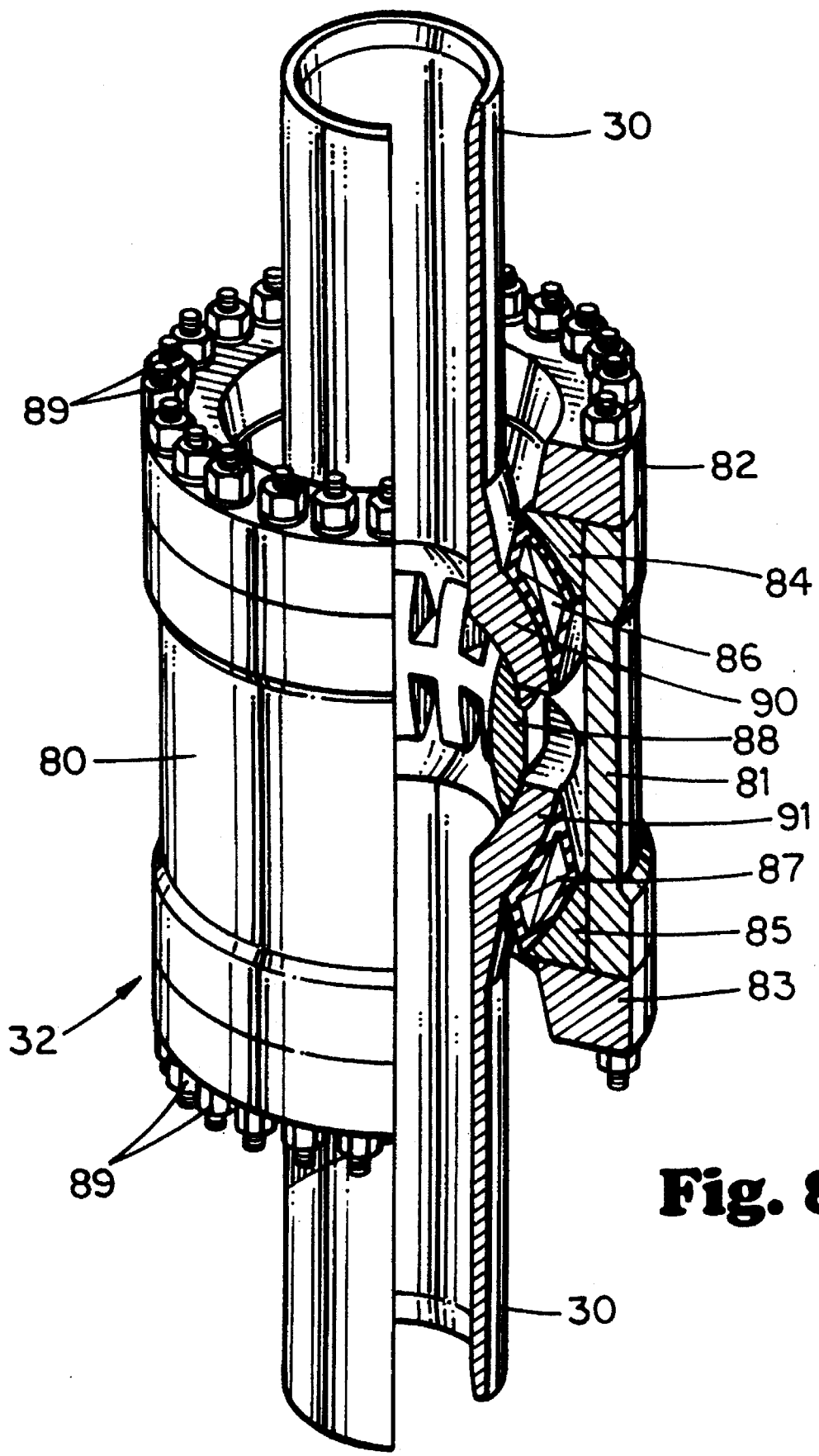
FIG. 8 is a partial sectional view of a typical flexible coupling utilized in the riser system of the invention.

Turning now to the structure of the flexible couplings 32, as shown in FIG. 8, each flexible coupling 32 comprises an outer body 80 made up of a central jacket 81 and upper and lower flanges 82 and 83 respectively. In the assembled coupling 32 represented in FIG. 8, the upper and lower flanges 82 and 83 are attached to the central jacket 81 by a plurality of threaded bolts and nuts 89. The upper and lower flanges 82, 83 facilitate assembly of the coupling as will be apparent through the following description, and serve to retain annular interface members 84 and 85. The annular interface members 84 and 85 may have a generally triangular or trapezoidal cross section. In the assembled coupling 32, the annular interface members 84, 85 bear against the upper and lower flanges 82 and 83 in the axial direction of the coupling 32 and against the central jacket 81 in the radial direction. Annular spherical bearings 86 and 87 are positioned adjacent to the annular interface members 84 and 85 and contact the flared ends 90 and 91 of the pipe sections 30. The ends 90 and 91 of the pipe sections 30 are flared spherically to accommodate continuous rotational contact with the spherical bearings 86, 87. Between the flared ends 90, 91 of the pipe sections 30 a transition ring 88 is provided. The transition ring 88 serves to reduce the inner diameter of the assembled coupling 32 in the vicinity of the flared ends 90, 91 of the pipe sections 30 and, thereby, facilitate movement of fluids or equipment through the coupling 32.

The annular spherical bearings 86, 87 are of a type generally known in the art and are typically made of an elastomeric material in combination with metallic shims. The thickness of the spherical bearings 86, 87, along with the geometry of the central jacket 81 and of the annular interface members 84, 85, determine the preload or predetermined compression of the spherical bearings 86, 87 during assembly of the coupling 32 on the ends 90, 91 of the pipe sections 30. Because the stiffness of the flexible coupling 32 is also a function of the spring rate, or compressibility, of the elastomeric material incorporated in the spherical bearings 86, 87, the stiffness may be selected by employing spherical bearings 86, 87 having predetermined elastomer spring rates or by the use of spherical bearings 86, 87 having predetermined geometries or compositions.

Thus it will be noted that the stiffness of the joints, or nodes, represented by the flexible couplings 32 in the present riser system 10 may be selectively determined by proper selection of the spherical bearings 86, 87. The bending moment transmitted to pipe sections 30 in the riser 12 will generally increase as the stiffness of the nodes formed by the flexible couplings 32 increases. In addition, the various flexible couplings 32 employed in a particular application need not have identical stiffness properties, but may be selected so as to optimize the performance of the riser system 10 by selectively controlling the bending moments, and hence the bending stresses, transmitted to the pipe sections 30.

For assembly of the coupling 32, the flanges 82, 83, the interface members 84, 85, and the spherical bearings 86, 87 are positioned around the pipe sections 30 adjacent the flared ends 90, 91. The coupling 32 is then assembled by joining the flared ends 90, 91 of the pipe sections 30 within the central jacket 81 and on either side of the transition ring 88, and by then bolting the flanges 82, 83 in place with the interface members 84, 85 and spherical bearings 86, 87 properly located within the central jacket 81. Proper torque is applied to the bolts 89 to ensure the proper compression of the spherical bearings 86, 87. The assembled coupling 32 permits the jointed pipe sections 30 to be displaced angularly with respect to one another with a predetermined stiffness in their displacement, while providing a fluid seal precluding both the intrusion of sea water into the coupling 32 and the extrusion of any fluid transported through the coupling 32 to the surrounding sea environment.

It will be noted that, as shown in FIGS. 4 and 5, the present riser system 10 may comprise a plurality of risers 12 disposed in a parallel arrangement. In such cases, each riser 12 will be coupled to a respective point 26 (not all shown) on the seabed 20 and rise to the platform 16. The construction of each riser 12 is identical to that described above. Where several risers 12 are thus disposed in a parallel arrangement, the individual risers 12 may be advantageously ganged or linked laterally to maintain a uniform spacing between the risers 12. Such ganging is particularly useful to avoid possible interference or contact between the risers 12 and to accommodate attachment to a single buoyancy element 52, or to a single, modified bouyancy element similar to element 62, but with a plurality of integral rigid pipe sections 67 as described above. The risers 12 are preferably ganged by the placement of spacers (not shown) securely attached between the risers 12. Such spacers may be made of an elastomeric material, or they may comprise rigid beams constructed of a metallic or synthetic material in combination with elastomeric shock absorbing elements.

As discussed above, an important aspect of the present riser system 10 resides in selection of the number, placement, and stiffness of the flexible couplings 32, and of the corresponding number and length of the intermediate pipe sections 30. This selection is preferably accomplished with the aid of a computerized riser simulation program. Known riser simulation programs generally permit the performance, configuration, and loads of a specific riser to be modeled prior to construction of the riser. Input parameters typically include the length of the riser, the depth of the water where the platform and the riser are to be positioned, the properties of the materials comprising the riser, and numerous inputs relating to the loading conditions, primarily the sea conditions anticipated or worst case movements of the platform 16 with respect to the seabed 20 and the riser 12. The data generated by such programs includes load and stress levels anticipated under given conditions. These data may then be compared with allowable limits for the materials selected for the riser, and the riser specifications may be altered if necessary to ensure that the anticipated load and stress levels are below the material limits. One such commercially available simulation program is marketed by Zentech International of London under the name Flexriser 4PC.

For determining of the number, placement, and stiffness of the flexible couplings 32 of the present riser system 10, a computerized riser simulation program is preferably employed. The Flexriser 4PC program offered by Zentech International has been used satisfactorily, although other programs may provide similar results. Although the riser simulation program used is of the type generally known, the manner in which the simulation is performed differs from the manner in which known risers are modeled. For known risers, material properties, including stiffness and weight, are generally considered constant over the entire length of the riser. This presumption is accurate for known rigid risers that are constructed of pipe sections of uniform size and weight. In the present riser system 10, however, flexible couplings 32 are modeled as separate node points along the length of the riser 12. These node points are assigned properties different from those of the pipe sections 28, 30 between which the flexible couplings 32 are placed.

One important property of the node points is their stiffness. Because the stiffness of a flexible coupling 32 is much lower than that of pipe sections 28, 30 of comparable length, the anticipated bending moments and bending stresses transmitted by the flexible coupling 32 are lower than would be the case for pipe sections in the same locations in a conventional rigid pipe riser. By providing as input data various combinations of numbers, placement, and stiffness of the node points, the riser system 10 may be optimized by reducing the anticipated bending stresses, while minimizing the cost of the riser. It should be understood that, while the bending stress is reduced by the inclusion of flexible couplings 32, each flexible coupling 32 adds to the cost of the riser system 10 as compared to the cost of a rigid pipe riser comprising only pipe sections. Thus, the number of flexible couplings 32 is generally kept to an acceptable minimum to optimize the cost of the riser system 10.

EXAMPLE

To provide an example of a riser system 10, a simulation was performed utilizing the Flexriser 4PC software mentioned above, offered by Zentech International. A 10 inch diameter production/export riser having a wall thickness of 0.5 inches was modeled for carrying oil in a water depth of 1000 feet. The simulated riser system was subjected to wave, current and vessel motions. Input data for the simulated riser system were as follows:

Internal diameter: 10 inches;

External diameter: 11 inches;

Pipe grade: API 5L, Grade X-65 or equivalent, having a yield strength of 65 kips per square inch (ksi);

Length of the riser: 2700 feet;

Internal design pressure: 2000 pounds per square inch (psi);

Configuration: Modified catenary (Lazy S) (input as the "static configuration").

The riser was assumed to be protected from corrosion by elastomeric coating or other means. The riser was assumed to be coupled at its upper end to a semi-submersible production facility, while the lower end of the riser was assumed to be coupled to a manifold or directly to a subsea pipeline. Buoyancy tracks were assumed to be attached to a segment of the riser to obtain the suitable modified catenary configuration (although alternative buoyancy arrangements would have provided similar results). The riser was assumed to be full of oil during its operating life, and in case the riser were purged of oil, water was assumed to replace it.

The riser was analyzed for certain extreme conditions. Factors determining the resulting design included internal and external pressures, wave parameters, current, and vessel motions. Wave conditions were based on 100 year wave conditions, expected to represent the worst environmental and motion conditions the riser would likely experience during its total service life. Conditions similar to those experienced in the Gulf of Mexico were utilized.

Four cases were analyzed, each having different input conditions:

Case 1: The static configuration for the "near position," or maximum approach of the vessel to the riser was modeled. The near position of 100 feet from the mean position was used as the vessel offset as called for by the program. This was used to establish the initial configuration.

Case 2: The static configuration for the "far position," or maximum distance (negative approach) of the vessel from the riser was modeled. The far position of 100 feet from the mean vessel position was used as the vessel offset as called for by the program. This was used to determine the maximum stretch of the riser.

Case 3: A dynamic analysis was performed for the cyclic vessel motion (surge, heave, and pitch) in the near position due to 100 year wave and current with an approach direction of 0 degrees (in line with the riser). The following parameters were used:

Wave height: 60 feet, period of 16 seconds;

Current velocity: 7 feet per second (4.14 knots) at surface with variation along the depth as per DNV;

Vessel static offset: 100 feet approach, 0 feet sway;

Vessel motion at wave period:

Wave amplitude: 20 feet;

Heave amplitude: 16 feet;

Pitch amplitude: 5 degrees.

Case 4: A dynamic analysis was performed for the cyclic vessel motion (sway, heave, and roll) in the near position due to 100 year wave and current with an approach direction of 90 degrees. The following parameters were used:

Wave height: 60 feet, period of 16 seconds;

Current velocity: 3.5 feet per second (2.07 knots) at surface with variation along the depth as per DNV;

Vessel static offset: 100 feet approach, 150 feet sway;
Vessel motion at wave period:
Sway amplitude: 20 feet;
Heave amplitude: 16 feet;
Roll amplitude: 5 degrees.

For the dynamic analyses, only the near position was investigated as it is generally expected to produce more critical bending moments in the riser than the far position. The results of the simulation were as follows:

Case 1: Approximately 400 feet of the riser remained on the seabed. The angle of departure at the top of the riser was 23 degrees from vertical. The tension on the riser was approximately 48 kips.

Case 2: The modified catenary (Lazy S) configuration was maintained. The top tension was estimated at 52 kips.

Case 3: The point at which the riser touched down on the seabed underwent very little motion, which is desirable. The maximum tension on the riser was about 63 kips, while the minimum was about 30 kips. Further simulation could ensure that no point on the riser undergoes compression during application of vessel motion. The maximum bending moment in the riser was 155 kip-feet. A bending stress of approximately 45 ksi was found. The total longitudinal stress was found to be well within the acceptable limits for X-65 Grade steel. The results indicated that the angle changes in the riser remained concentrated at the flexible couplings, modeled as nodes in the riser. The magnitude of angular displacement varied from node to node. The maximum angular displacement of the flexible couplings, other than the coupling provided at the top of the riser for attachment to the platform, was approximately 9 degrees.

Case 4: Considerable traverse movement of the riser due to vessel drift and sway was found. Because the current was assumed to act in a direction traverse to the riser, the pipe segments were subjected to bi-axial bending. The point at which the riser touched the seabed did not change appreciably from the previous cases because the modified catenary configuration afforded sufficient flexibility to the riser to accommodate large movements by stretching out the natural catenary droop curves. The tension range at the top of the riser was from 40 to 60 kips. The maximum bending moment was approximately 130 kip-feet. Shear forces were relatively negligible.

The number of flexible couplings 32 found desirable in the simulated riser system 10 was eleven. The placement of the flexible couplings 32 along the riser 12, from the upper end 14 downwardly, was as follows:

first coupling: 950 feet;
second coupling: 1050 feet;
third coupling: 1170 feet;
fourth coupling: 1330 feet;
fifth coupling: 1520 feet;
sixth coupling: 1580 feet;
seventh coupling: 1650 feet;
eighth coupling: 1760 feet;
ninth coupling: 2010 feet;
tenth coupling: 2120 feet;
eleventh coupling: 2230 feet.

The length of the pipe sections 28, 30, of course, corresponds to the difference between the placement distances of successive flexible couplings 32. The stiffness of the flexible couplings 32 was considered uniform at 20,000 foot-pounds per degree. The buoyancy elements were modeled having a net buoyancy of 0.185 kips per foot. The buoyancy elements were distributed over a length of the riser 12 between the fourth and the ninth flexible couplings 32. The angular capacity requirement of the upper flexible coupling for coupling the upper end 14 of the riser 12 to the platform 16 was found to be approximately 15 degrees. The combined stresses due to internal pressures and forces due to weight, buoyancy, wave, current and vessel movement indicated stress levels within the yeild strength of steel conforming to Grade X-65.

The riser system 10 may be assembled and deployed by any suitable method. However, two methods are preferred. A first preferred method of assembly and deployment consists of welding and coupling the pipe sections 28, 30 and flexible couplings 32 at the site of the final installation, employing a lay barge of the type known in the art. In this method, the riser 12 is gradually assembled in situ and deployed in accordance with known techniques similar to those employed for the deployment of rigid pipe risers.

In a second preferred method for assembly and deployment of the riser system 10, the riser pipe sections 28, 30 are welded, and the flexible couplings 32 are attached to the pipe sections 28, 30 at a dockside location. The riser 12 is then capped, pressurized with air, and towed to the installation location using additional flotation collars similar to the buoyancy elements 42 if necessary.

As depicted in FIG. 9, upon arrival at the installation site, the riser 12 is positioned on the sea surface 18 by work boats 100, 101. A first work boat 100 positions the upper end 14 of the riser 12 near the platform 16, while a second work boat 101 locates the lower end 26 of the riser 12 over the subsea location 28. As illustrated in FIG. 10, the upper end 14 of the riser 12 is then temporarily attached to the platform 16, but the final connection to the platform piping is not made. Once this temporary attachment is complete, the first work boat 100 moves to central location along the riser 12 as shown in FIG. 11, and the work boats 100, 101 anchor to the seabed at attachment points 44, 28 using anchor lines 102 and 104, and guide cables 103 and 105 respectively. The riser 12 is then flooded and allowed to sink slowly, guided toward the seabed 20 by the guide cables 103 and 105. The work boats 100, 101 control the positioning of the riser 12 as the riser 12 descends toward the attachment points 44, 28. Once the riser 12 is in place, the final connections at the lower end 26 to the subsea location 28 and at the upper end 14 to the platform piping can be completed. The continuous bend of the modified catenary configuration is achieved in the example illustrated in FIGS. 9 through 11 by attachment of a tension member 46 as shown in FIG. 2, and as described above. The riser 12 is then purged of water and operational inspections and tests may be performed.

Where certain installations make this second assembly and deployment method unfeasible or undesirable, for instance due to possible interference with anchor or mooring lines (not shown) extending from a platform 16, more conventional lay barge deployment may be preferred. It is, of course, understood that the riser system 10 may be assembled and deployed by any other method as will be apparent to one skilled in the art.

We claim:

1. A riser for coupling an offshore platform to a subsea location on a seabed, said riser comprising:
a first rigid riser section having a first end portion and a second end portion, said first end portion being coupled to said offshore platform;

a last rigid riser section having a first end portion and a second end portion, said second end portion of said last rigid riser section being coupled to said subsea location;

at least one intermediate rigid riser section;

a first flexible elastomeric coupling joining the first rigid riser section to the at least one intermediate rigid riser section;

a second flexible elastomeric coupling joining the at least one intermediate rigid riser section to the last rigid riser section; and wherein each of the flexible elastomeric couplings permits the adjacent rigid riser sections to be displaced angularly with respect to one another with a predetermined stiffness, so that said riser can be deployed in a catenary configuration.

2. The riser as set forth in claim 1, wherein each of said plurality of flexible couplings has a respective predetermined stiffness.

3. The riser as set forth in claim 2, wherein the predetermined stiffness of at least one flexible coupling of said plurality of flexible couplings is different from the predetermined stiffness of at least one other flexible coupling of said plurality of flexible couplings, said respective predetermined stiffnesses being selected to control bending moments transmitted to said pipe sections.

4. The riser as set forth in claim 1, wherein said first rigid riser section is coupled to said offshore platform by a flexible coupling.

5. The riser as set forth in claim 1, further comprising:

a plurality of buoyancy elements positioned along a portion of said riser to raise said portion of said riser, thereby deploying said riser in a modified catenary configuration; and a tension member coupled to said riser and to the seabed to limit movement of said riser.

6. The riser as set forth in claim 5, wherein said buoyancy elements are synthetic foam elements.

7. The riser as set forth in claim 5, wherein said buoyancy elements are individual buoyancy tanks.

8. The riser as set forth in claim 1, further comprising:

a buoyancy element coupled at a given location along said riser to raise said riser, thereby deploying said riser in a modified catenary configuration; and a tension member coupled to said riser and to the seabed to limit movement of said riser.

9. The riser as set forth in claim 1, further comprising:

a buoyancy element coupled at a given location along said riser to raise said riser, thereby deploying said riser in a modified catenary configuration;

a rigid riser section integral with said buoyancy element, said rigid riser section being coupled in series with said rigid riser sections by flexible couplings; and a tension member coupled to said riser and to the seabed to limit movement of said riser.

10. A flexible/rigid riser system for coupling an offshore platform to a plurality of subsea locations on a seabed, said system comprising:

a plurality of risers, each of said risers comprising:

a first rigid riser section having a first end portion and a second end portion, said first end portion being coupled to said offshore platform;

a last rigid riser section having a first end portion and a second end portion, said second end portion of said last rigid riser section being coupled to said respective subsea location;

at least one intermediate rigid riser section;

a first flexible elastomeric coupling joining the first rigid riser section to the at least one intermediate rigid riser section;

a second flexible elastomeric coupling joining the at least one intermediate rigid riser section to the last rigid riser section; and wherein each of the flexible elastomeric couplings permits the adjacent rigid riser sections to be displaced angularly with respect to one another with a predetermined stiffness, so that said riser can be deployed in a catenary configuration.

11. The riser system as set forth in claim 10, further comprising a plurality of spacers attached along and between said plurality of risers to hold said plurality of risers in a substantially parallel arrangement and to maintain spacing therebetween.

12. The riser system as set forth in claim 10, wherein each of said flexible couplings has a respective predetermined stiffness.

13. The riser system as set forth in claim 12, wherein the predetermined stiffness of at least one flexible coupling in said plurality of flexible couplings in each of said risers is different than the predetermined stiffness of at least one other flexible coupling in said plurality of flexible couplings in the respective riser, said respective predetermined stiffnesses being selected to control bending moments transmitted to said pipe sections in each of said risers.

14. The riser system as set forth in claim 10, wherein said first rigid riser section of each of said risers is coupled to said offshore platform by a flexible coupling.

15. The riser system as set forth in claim 10, further comprising:

a buoyancy element positioned at a given location along said riser system to raise said plurality of risers, thereby deploying said plurality of risers in a modified catenary configuration; and a tension member coupled to said riser system and to the seabed to limit movement of said risers.

16. The riser system as set forth in claim 10, further comprising:

a buoyancy element positioned at a given location along said riser system to raise said plurality of risers, thereby deploying said plurality of risers in a modified catenary configuration;

a plurality of intermediate rigid riser sections integral with said buoyancy element, one of said intermediate rigid riser sections being coupled in series with respective rigid riser sections of a respective one of said risers by said flexible couplings; and a tension member coupled to said riser system and to the seabed to limit movement of said risers.

17. A riser for coupling an offshore platform to a subsea location on a seabed, said riser comprising:

a first rigid riser section having a first end portion and a second end portion, said first end portion being coupled to said offshore platform;

a last rigid riser section having a first end portion and a second end portion, said second end portion of said last rigid riser section being coupled to said subsea location;

at least one intermediate rigid riser section;

a first flexible elastomeric coupling joining the first rigid riser section to the at least one intermediate rigid riser section;

a second flexible elastomeric coupling joining the at least one intermediate rigid riser section to the last rigid riser section; and wherein each of the flexible elastomeric couplings comprises a body having a hollow inner portion and upper and lower flanges extending radially into said inner portion, upper and lower annular interface members disposed on said body within said hollow inner portion against said upper and lower flanges respectively, and upper and lower annular spherical elastomeric bearings disposed adjacent the upper and lower annular interface members respectively and abut opposite ends of respective adjacent rigid riser sections.

18. The riser as set forth in claim 17, wherein the end portions of the rigid riser sections are flared spherically to accommodate continuous rotational contact with respective spherical bearings.

19. The riser as set forth in claim 18, wherein further comprising a plurality of transition rings, each transition ring being disposed between the flared ends of respective adjacent rigid riser sections.

20. The riser as set forth in claim 17, wherein the annular spherical bearings are formed of an elastomeric material having metal shims.

* * * * *